(12) United States Patent
Yamamoto et al.

(10) Patent No.: US 8,556,324 B1
(45) Date of Patent: Oct. 15, 2013

(54) UTILITY VEHICLE

(71) Applicant: Kawasaki Jukogyo Kabushiki Kaisha, Hyogo (JP)

(72) Inventors: Teruaki Yamamoto, Kakogawa (JP); Itsuo Takegami, Kobe (JP)

(73) Assignee: Kawasaki Jukogyo Kabushiki Kaisha, Hyogo (JP)

( * ) Notice: Subject to any disclaimer, the term of this patent is extended or adjusted under 35 U.S.C. 154(b) by 0 days.

(21) Appl. No.: 13/729,758

(22) Filed: Dec. 28, 2012

(51) Int. Cl.
*B62D 25/06* (2006.01)
*B60R 22/00* (2006.01)

(52) U.S. Cl.
USPC ................ 296/68.1; 296/65.09; 296/26.11; 280/801.1

(58) Field of Classification Search
USPC ................ 296/65.09, 26.11, 68.1; 280/801.1, 280/801.2
See application file for complete search history.

(56) References Cited

U.S. PATENT DOCUMENTS

| | | |
|---|---|---|
| 6,905,159 B1 | 6/2005 | Saito et al. |
| 6,994,388 B2 | 2/2006 | Saito et al. |
| 7,249,798 B2 | 7/2007 | Saito et al. |

*Primary Examiner* — Joseph Pape
*Assistant Examiner* — Dana Ivey
(74) *Attorney, Agent, or Firm* — Wenderoth, Lind & Ponack, L.L.P.

(57) ABSTRACT

A utility vehicle according to the present invention includes a front seat, a rear seat, a cargo bed, a screen, and seat belt systems, the cargo bed is changeable between an expanded state and a non-expanded state, the screen has a movable mount in a lower end, the screen is movable between a first position and a second position, each of the seat belt systems has a three-point seat belt structure, a bottom anchor, a retractor, and a buckle are provided in the movable mount, and a top anchor is provided in the screen.

4 Claims, 13 Drawing Sheets

UTILITY VEHICLE

FIELD OF THE INVENTION

The present invention relates to a utility vehicle in which a cargo bed can be expanded forward so as to utilize an area or a capacity of a cargo bed space and a riding space to a maximum extent according to need of a user.

DESCRIPTION OF THE RELATED ART

The present applicant filed applications of the inventions relating to a utility vehicle having a cargo bed in which an area or a capacity can be expanded, and those applications have already been registered. Examples include U.S. Pat. No. 6,905,159, U.S. Pat. No. 6,994,388, and U.S. Pat. No. 7,249,798.

In utility vehicles shown in the above documents, a front seat and a rear seat are arranged in a riding space covered by a ROPS, and a cargo bed is arranged behind the rear seat. By changing the rear seat from a use state to a stowed or retracted state, a front part of the cargo bed can be expanded into the riding space which is occupied by the rear seat in the use state.

Such a utility vehicle is generally equipped with as many seat belt systems as the fixed number of passengers.

Regarding the front seat including a seat area for a driver, three-point seat belt systems are already provided for all seat areas. Regarding the stowable or retractable rear seat, the three-point seat belt systems are also provided for all seat areas in recent years. Particularly in a case where the rear seat is three-seater, a two-point seat belt used be provided for a central seat area in many cases. However, recently, the three-point seat belt systems are provided for all the seat areas.

Nevertheless, in a case of the stowable rear seat, when the three-point seat belt systems are provided for all the seat areas of the rear seat, webbings for the rear seat are uselessly pulled out from retractors upon stowing the rear seat. Thus, the webbings are disturbing, so that a task of stowing the rear seat requires a lot of time and effort.

SUMMARY OF THE INVENTION

An object of the present invention is to provide a utility vehicle in which a riding space is surrounded by a ROPS, a rear seat is freely stowed, a cargo bed can be expanded forward, and upon stowing the rear seat, a three-point seat belt system for the rear seat is not disturbing, so that the rear seat can be promptly stowed.

In order to solve the above problem, the present invention is to provide a utility vehicle including a front seat, a rear seat, a cargo bed, a screen for partitioning the cargo bed and a riding space on the front side of the cargo bed, and seat belt systems for passengers, the cargo bed being changeable between an expanded state in which the cargo bed is expanded forward into an area of the rear seat and a non-expanded state in which the cargo bed is not expanded in the area of the rear seat, wherein a movable mount is secured to a lower end of the screen, the screen is movable between a first position corresponding to a front end of the cargo bed in the expanded state and a second position corresponding to the front end in the non-expanded state in the front and rear direction together with the movable mount, each of the seat belt systems has a three-point seat belt structure, a bottom anchor and a retractor for supporting both ends of a webbing of the seat belt system for the rear seat and a buckle are provided in the movable mount, and a top anchor for supporting the middle of the webbing on the upper side of a back rest of the rear seat is provided in the screen.

With the above configuration, when the cargo bed is changed between the expanded state and the non-expanded state with the three-point seat belt system provided for the rear seat, the bottom anchor, the buckle, and the like of the seat belt system are not disturbing, so that the screen can be easily moved in the front and rear direction.

The movable mount for supporting the screen is supported by a chassis movably in the front and rear direction. Thus, at the time of moving the screen, there is no need for two workers to lift the screen from both the left and right sides, so that even one worker can easily move the screen.

The present invention can preferably further include the following configurations.

(a) A lock device capable of fixing the screen and the movable mount at the first position and the second position is provided.

With the above configuration, the top and bottom anchors for supporting the webbing of the seat belt system and the buckle can be firmly supported by a vehicle body via the movable mount and the like.

(b) The back rest for the rear seat is attached to the screen.

With the above configuration, by moving the screen forward, the back rest can be also automatically moved forward, so that a task of changing a position of the screen can be easily performed.

(c) A front end of a seat bottom of the rear seat is pivotably supported by a vehicle body frame member, and the seat bottom is accommodated on the front side of the first position of the screen when the cargo bed is in the expanded state.

With the above configuration, a task of accommodating the seat bottom of the rear seat at the time of expansion of the cargo bed is easily performed.

DETAILED DESCRIPTION OF THE INVENTION

FIGS. 1 to 13 show one embodiment of a utility vehicle according to the present invention, and the embodiment will be described based on these figures.

[Entire Structure of Vehicle]

Figure 1:
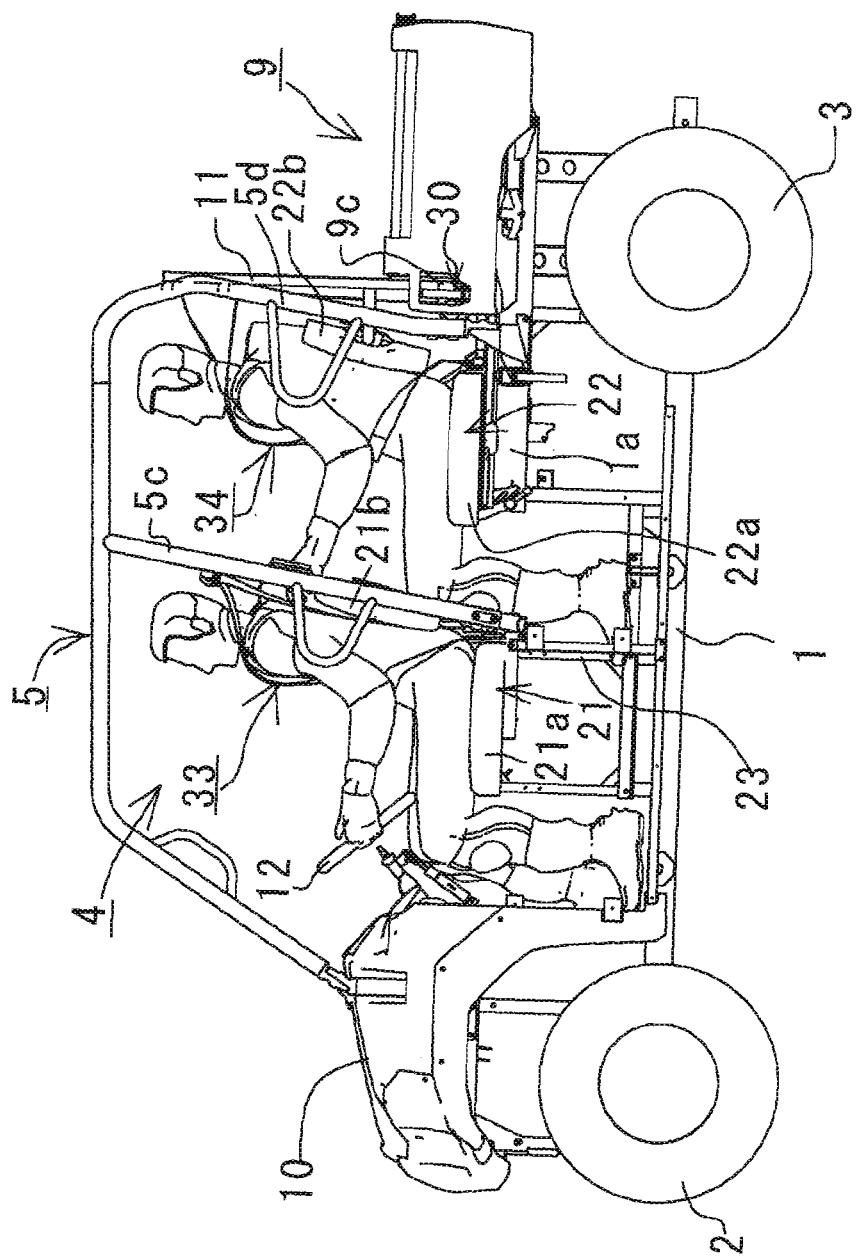
FIG. 1 is a left side view of a utility vehicle according to the present invention at the time of non-expansion of a cargo bed.
Figure 2:
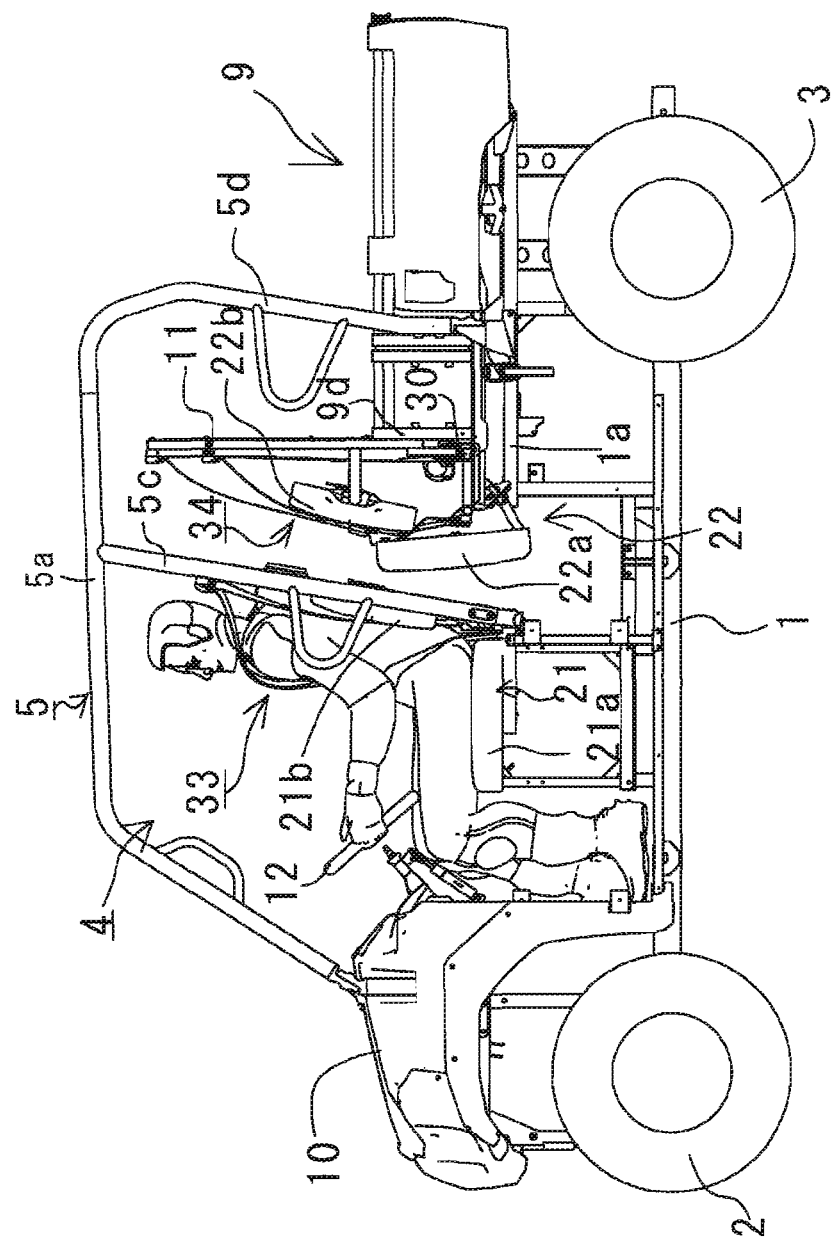
FIG. 2 is a left side view of the utility vehicle of FIG. 1 at the time of expansion of the cargo bed.
Figure 3:
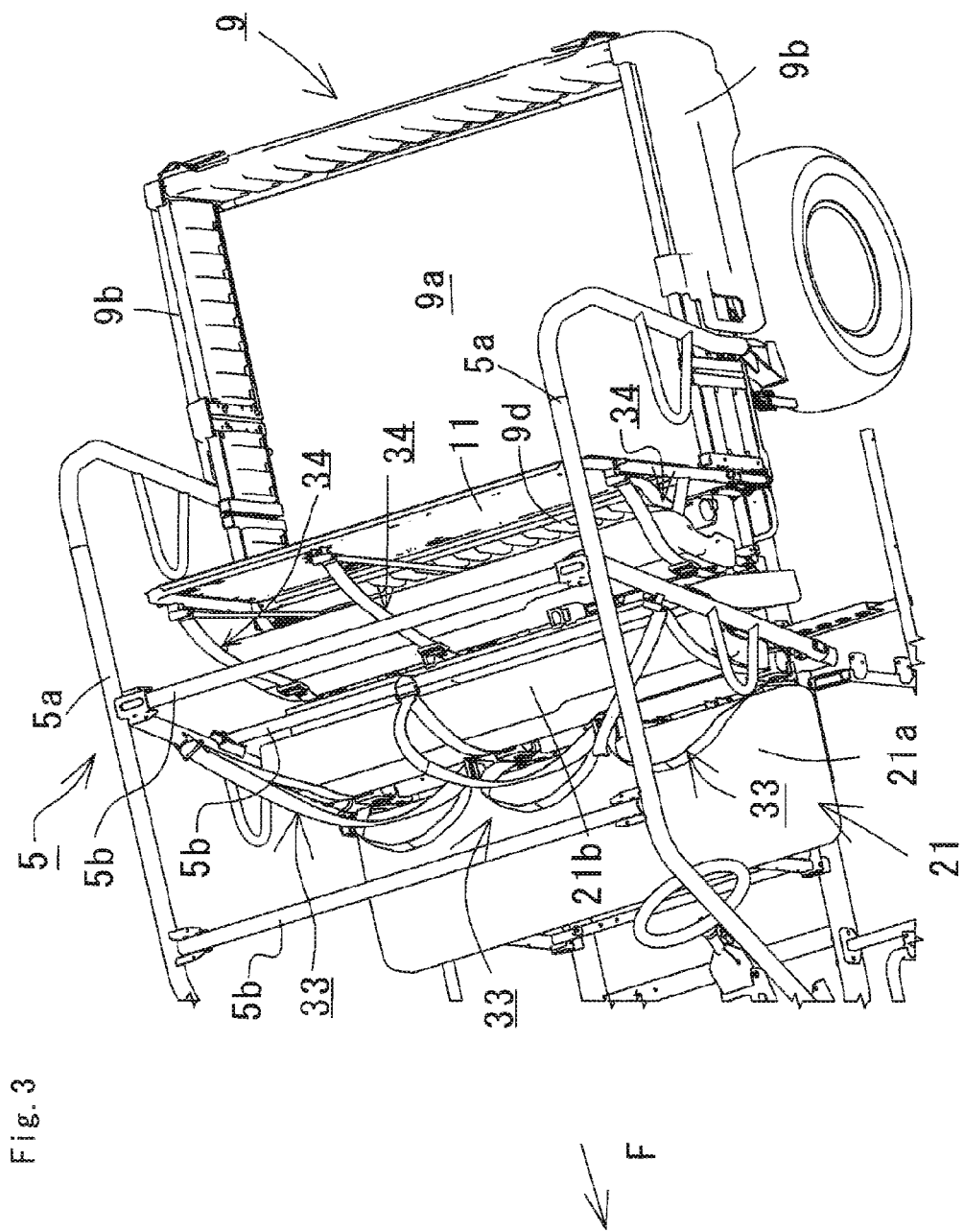
FIG. 3 is a perspective view of the utility vehicle of FIG. 1 at the time of the expansion of the cargo bed.

FIGS. 1 and 2 are left side views of the utility vehicle according to the present invention, and the arrow F direction is the vehicle forward direction. In FIGS. 1 and 2, the utility vehicle is provided with a pair of left and right front wheels 2 in a front part of a chassis 1, a pair of left and right rear wheels 3 in a rear part of the chassis 1, and a riding space (cabin) 4 between the front wheels 2 and the rear wheels 3. The riding space 4 is surrounded by a ROPS 5. An expandable cargo bed 9 is provided behind the riding space 4, and a bonnet 10 is provided in front of the riding space 4. A screen 11 for partitioning the cargo bed 9 and the riding space 4 is provided in a front end (front wall 9d) of the cargo bed 9. An operation portion (dashboard) such as a handle 12 is provided in a front end of the riding space 4.

Figure 4:
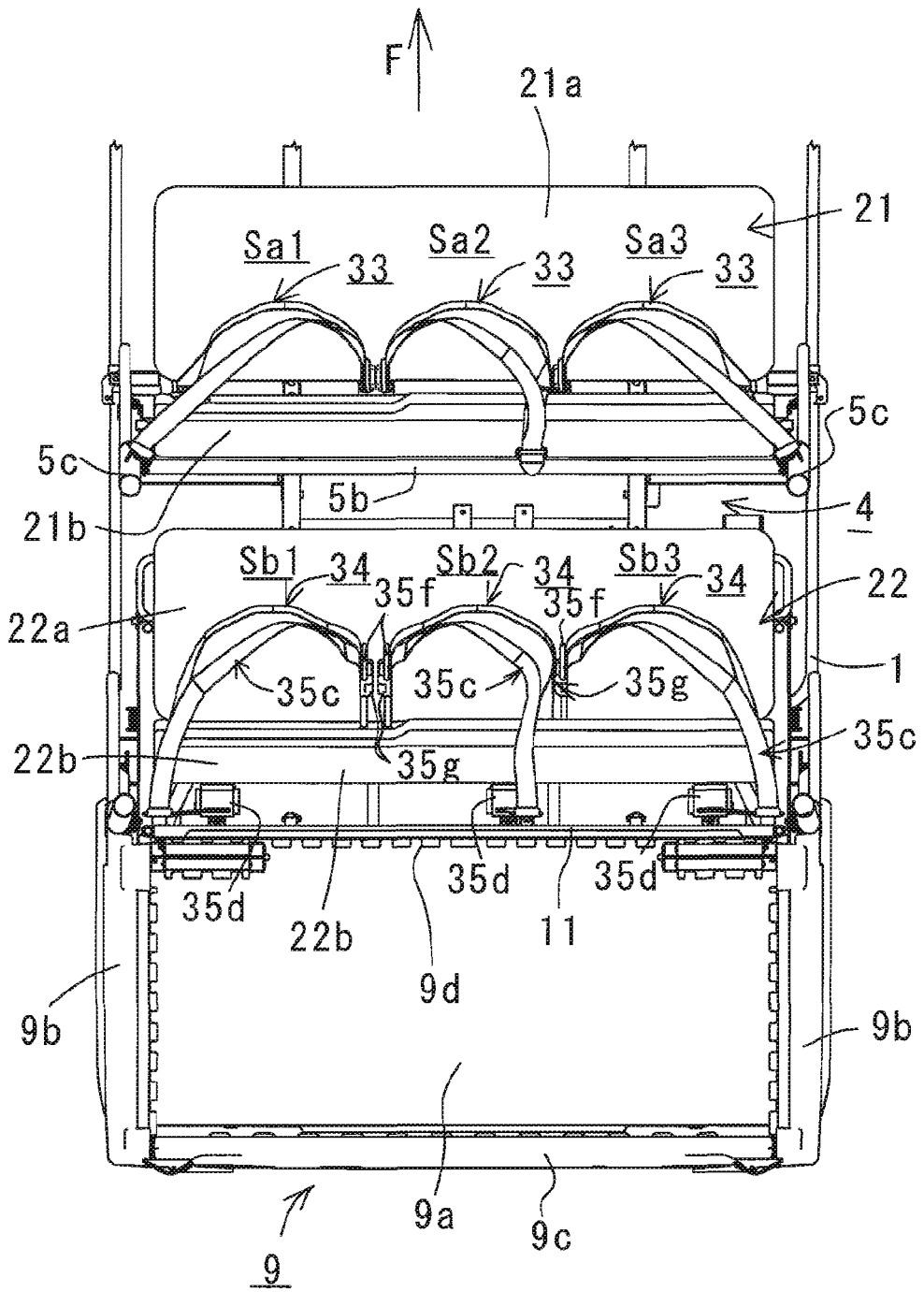
FIG. 4 is a plan view of the utility vehicle of FIG. 1 at the time of the non-expansion of the cargo bed.

In FIG. 4 showing a plan view of the utility vehicle, a bench type front seat 21 is installed in a front half part of the riding space 4, and a bench type stowable rear seat 22 is installed in a rear half part of the riding space 4. The front seat 21 is provided with one rectangular seat bottom 21a elongated in the lateral direction and one rectangular back rest 21b elongated in the lateral direction. The rear seat 22 is provided with one rectangular seat bottom 22a elongated in the lateral direction and one rectangular back rest 22b.

In the embodiment, the bench type front seat 21 and the bench type rear seat 22 are respectively three-seater. Accordingly, three seat areas Sa1, Sa2, Sa3 of the front seat 21 and three seat areas Sb1, Sb2, Sb3 of the rear seat 22 are respectively provided with three-point seat belt systems 33, 34. The left seat area Sa1 of the front seat 21 is a driver seat.

[Configuration of ROPS 5 and Cargo Bed 9]

Figure 11:
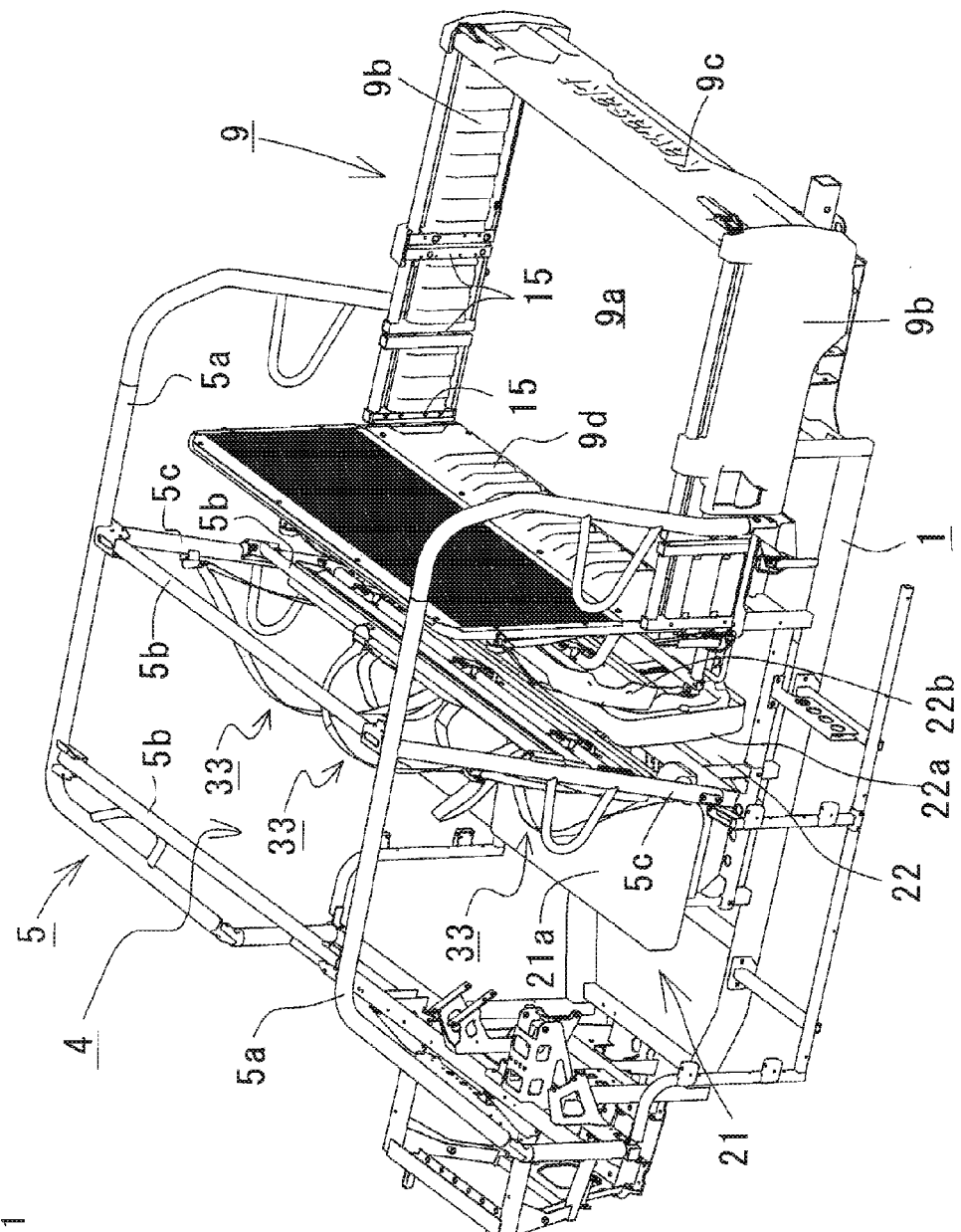
FIG. 11 is a perspective view of the rear seat, the screen, and the cargo bed at the time of the expansion of the cargo bed when seen from the rear upper side.
Figure 12:
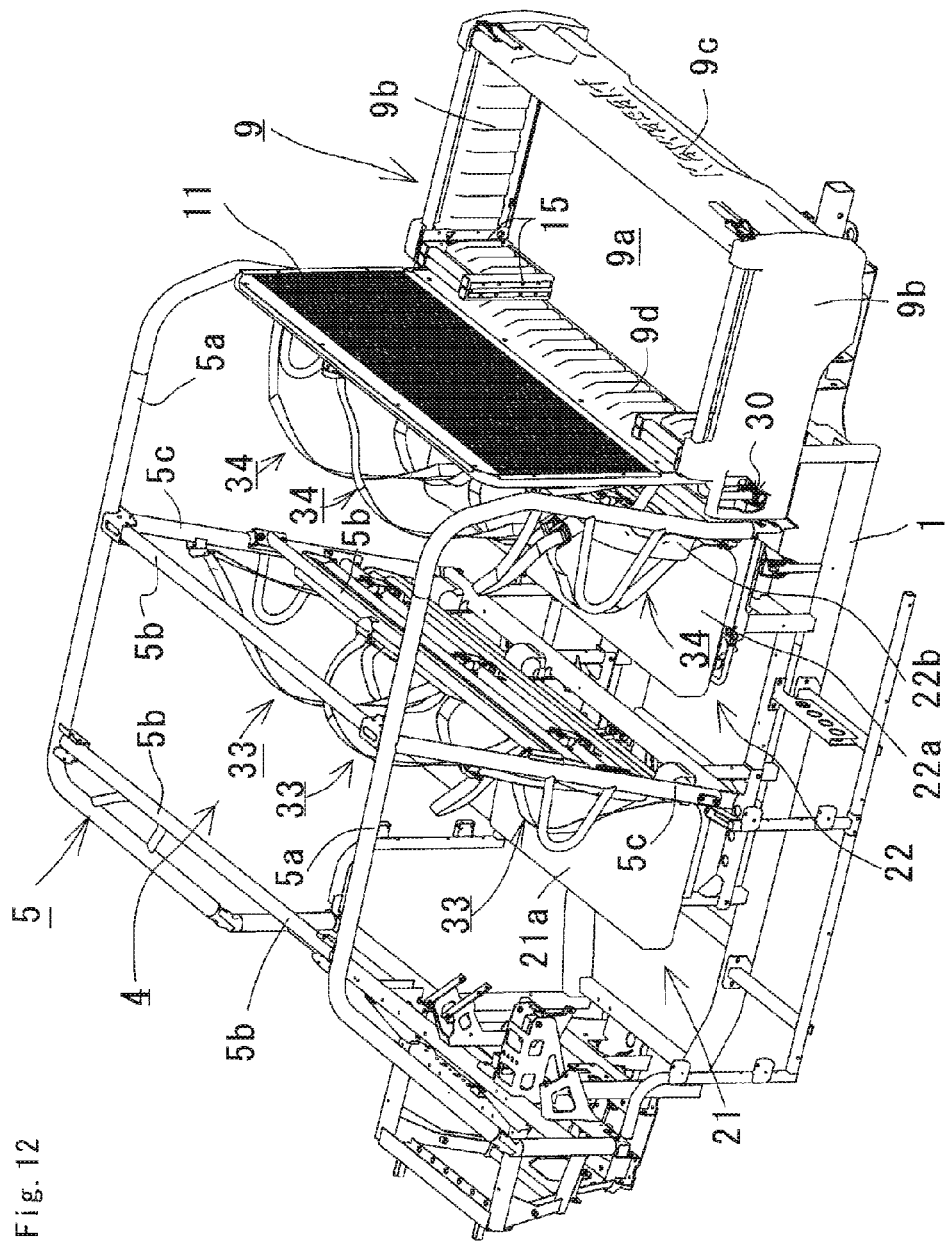
FIG. 12 is a perspective view of the rear seat, the screen, and the cargo bed at the time of the non-expansion of the cargo bed when seen from the rear upper side.

FIG. 11 is a perspective view of the utility vehicle at the time of expansion of the cargo bed when seen from the rear upper side, and FIG. 12 is a perspective view of the utility vehicle at the time of non-expansion of the cargo bed when seen from the rear upper side. In FIG. 11, the ROPS 5 is an abbreviation of a rollover protective structure, and the ROPS 5 is formed by a pair of left and right E-shape side pipe units 5a, and a plurality of cross pipes 5b for coupling both the side pipe units 5a.

The cargo bed 9 is provided with a bottom wall 9a, left and right side walls 9b, a rear wall 9c, and the front wall 9d. Front half parts of the left and right side walls 9b are foldable by a plurality of hinge portions 15, and the front wall 9d is combined to front ends of the left and right side walls 9b.

As shown in FIG. 11, by extending the left and right side walls 9b into a straight form, the cargo bed 9 is brought into an expanded state. In this case, the rear seat 22 is stowed on the rear side of the front seat 21. Meanwhile, as shown in FIG. 12, by folding the left and right side walls 9b, the cargo bed 9 is brought into a non-expanded state. In this case, the rear seat 22 is in a use state that a passenger can be seated.

[Configuration of Rear Seat 22 and Screen 11]

Figure 9:
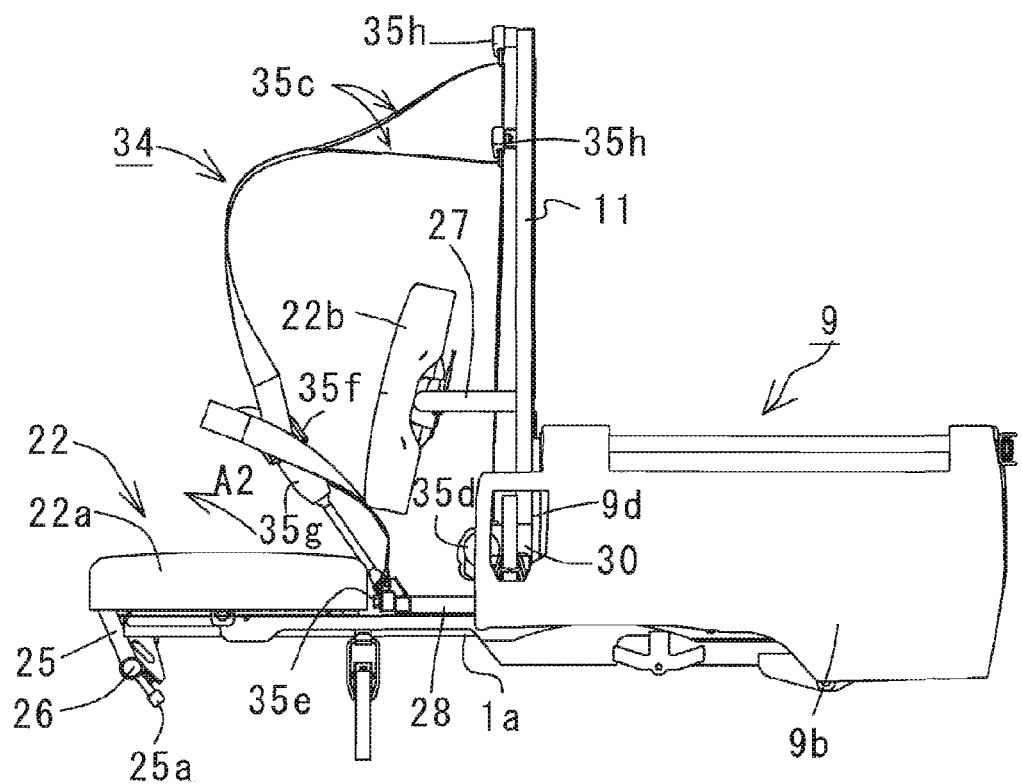
FIG. 9 is a left side view of the rear seat, the screen, and the cargo bed at the time of the non-expansion of the cargo bed.
Figure 10:
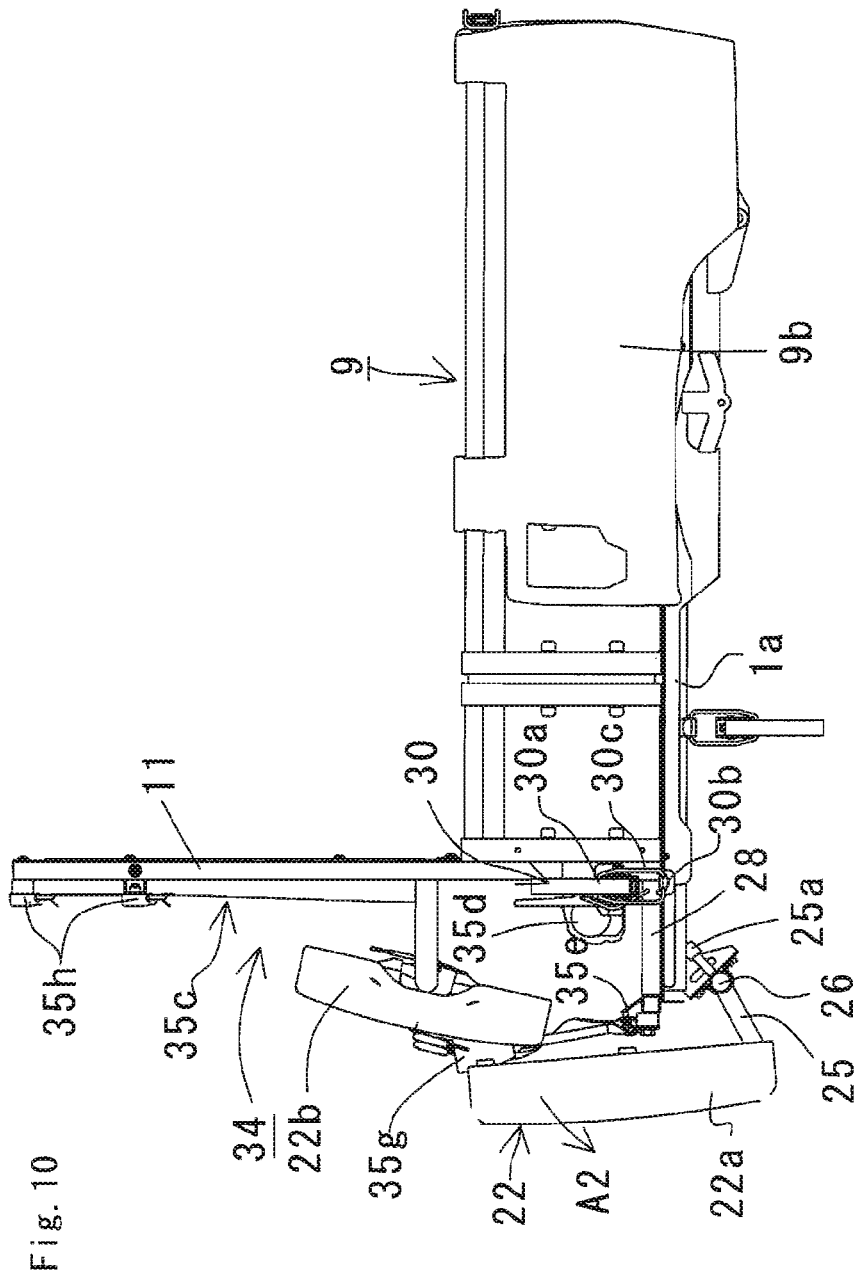
FIG. 10 is a left side view of the rear seat, the screen, and the cargo bed at the time of the expansion of the cargo bed.

FIG. 9 is a left side view of the rear seat 22, the screen 11, and the cargo bed 9 at the time of the non-expansion of the cargo bed 9, and FIG. 10 is a left side view of the rear seat 22, the screen 11, and the cargo bed 9 at the time of the expansion of the cargo bed 9. The rear seat 22 is in the use state that the passenger can be seated while facing forward in FIG. 9, and is in a stowed state that the seat bottom 22a is stowed into the front upper side in FIG. 10. A specific stowing structure will be described. In FIG. 9, a front end of the seat bottom 22a of the rear seat 22 is pivotably supported by a front end of a cargo bed support frame 1a of the chassis 1 via an arm 25 and a hinge 26. The back rest 22b of the rear seat 22 is fixed to the screen 11 by an attachment pipe 27. The back rest 22b is movable in the front and rear direction together with the front wall 9d and the screen 11.

When the rear seat 22 is in the use state shown in FIG. 9, the seat bottom 22a is disposed on an upper surface of the front end of the cargo bed support frame 1a, and the back rest 22b is placed on the upper side of the vicinity of a rear end of the seat bottom 22a. Meanwhile, when the rear seat 22 is in the stowed state shown in FIG. 10, the seat bottom 22a is pivoted anti-clockwise (in the arrow A2 direction) on the front hinge 26 and brought into a substantially vertical state at a position in the vicinity of the front end of the cargo bed support frame 1a. At this time, a stopper 25a provided in the arm 25 of the seat bottom 22a is abutted with the cargo bed support frame 1a, so that the seat bottom 22a is maintained in a substantially vertical posture. Meanwhile, the back rest 22b is moved forward together with the front wall 9d and the screen 11 so as to be abutted with or brought close to an upper rear surface of the seat bottom 22a.

In FIG. 9, the screen 11 is fixed to the front wall 9d of the cargo bed 9 as described above. Further, an L shape movable mount 28 whose lower piece protrudes forward in a side view is secured to a lower end of the screen 11. Although not shown, a plurality of rollers is rotatably provided on a lower surface of the movable mount 28, and the movable mount is supported on an upper surface of the cargo bed support frame 1a via these rollers movably in the front and rear direction. Thereby, a position of the screen 11 can be changed between a first position at the time of the expansion of the cargo bed (FIG. 10) and a second position on the rear side of the first position at the time of the non-expansion of the cargo bed (FIG. 9) integrally with the movable mount 28 and the front wall 9d. Lock devices 30 for fixing the screen 11 to the cargo bed support frame 1a at the first position and the second position respectively are respectively provided in both left and right side parts of the lower end of the screen 11.

Figure 13:
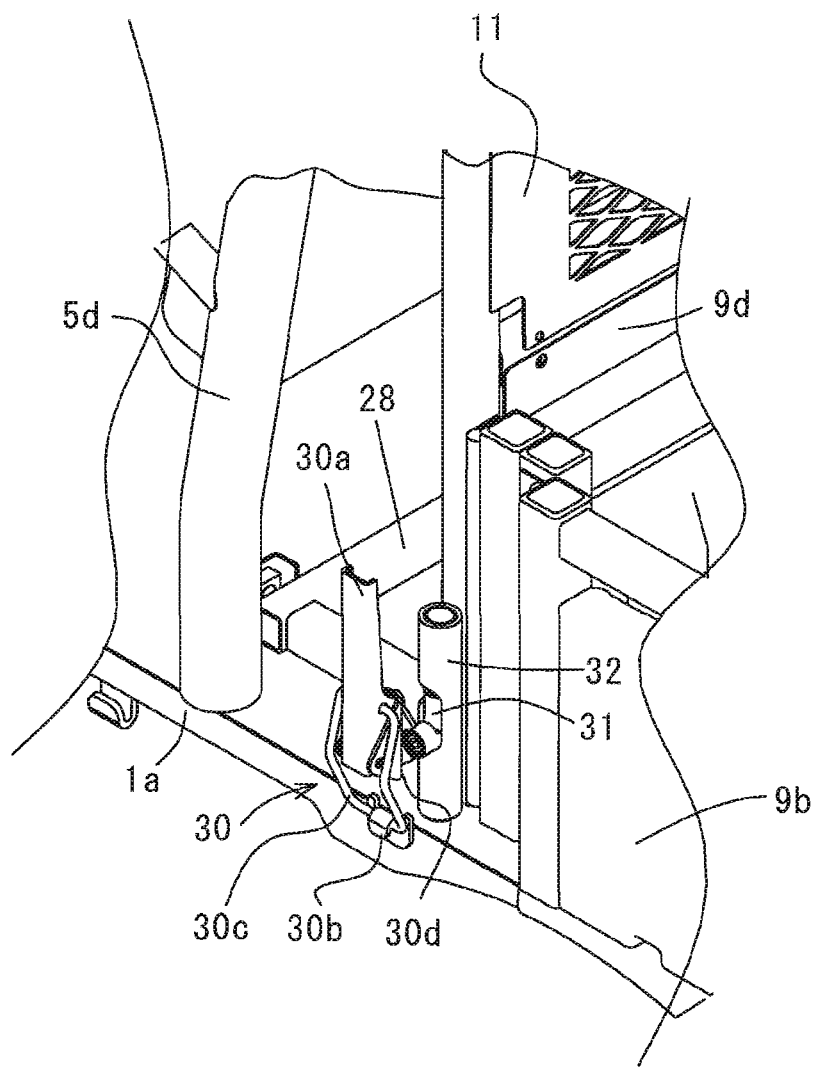
FIG. 13 is an enlarged perspective view of a lock device of the screen.

In FIG. 13, each of the lock devices 30 is provided with a lever 30a, a hook 30b provided in the cargo bed support frame 1a, and a ring 30c coupled to the middle of the lever 30a and caught on the hook 30b. The lever 30a is pivotably supported by a holder 30d, and the holder 30d is secured to a substantially vertical positioning and pivot pin 31. The pivot pin 31 is fitted to a retaining pipe 32 secured to the lower end of the screen 11 movably in the up and down direction. Positioning holes (not shown) are formed in the cargo bed support frame 1a at positions corresponding to the first position and the second position of the screen 11 respectively. By inserting the pivot pin 31 into the positioning holes, the screen 11 and the front wall 9d are precisely locked at the first and second positions. The pivot pin 31 is pivotable on a pivot pin axis at a lifted position within a range of substantially 90°. That is, at the time of moving the screen 11 between the first position and the second position, by lifting and pivoting the lever 30a and the holder 30d on the pivot pin 31 by 90°, the lever 30a and the holder 30d can be placed on the inner side in the vehicle width direction of a rear end vertical pipe 5d of the ROPS 5. Thereby, without contact with the rear end vertical pipe 5d, the lever 30a and the holder 30d can be moved in the front and rear direction.

[Configuration of Seat Belt System 34 for Rear Seat]

Figure 5:
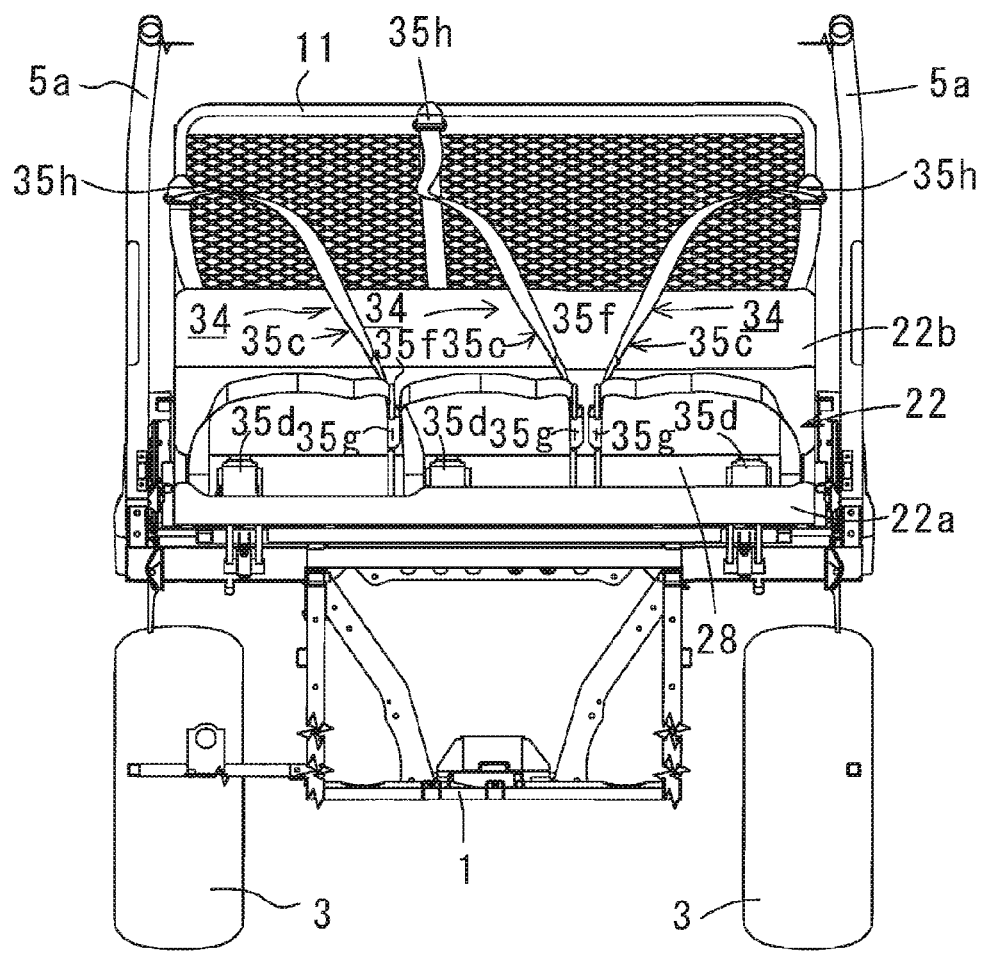
FIG. 5 is a front view of a rear seat and a screen at the time of the non-expansion of the cargo bed.
Figure 6:
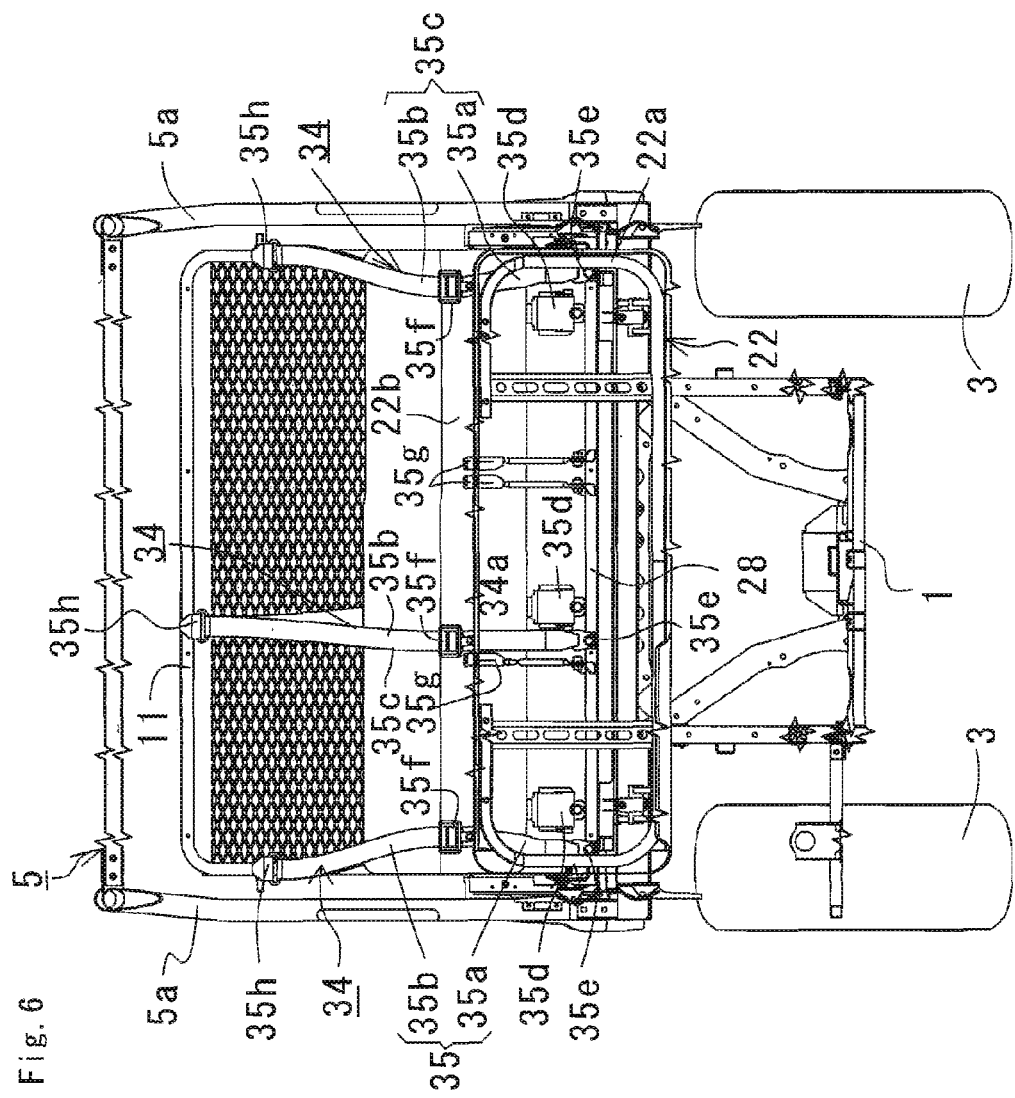
FIG. 6 is a front view of the rear seat and the screen at the time of the expansion of the cargo bed.
Figure 7:
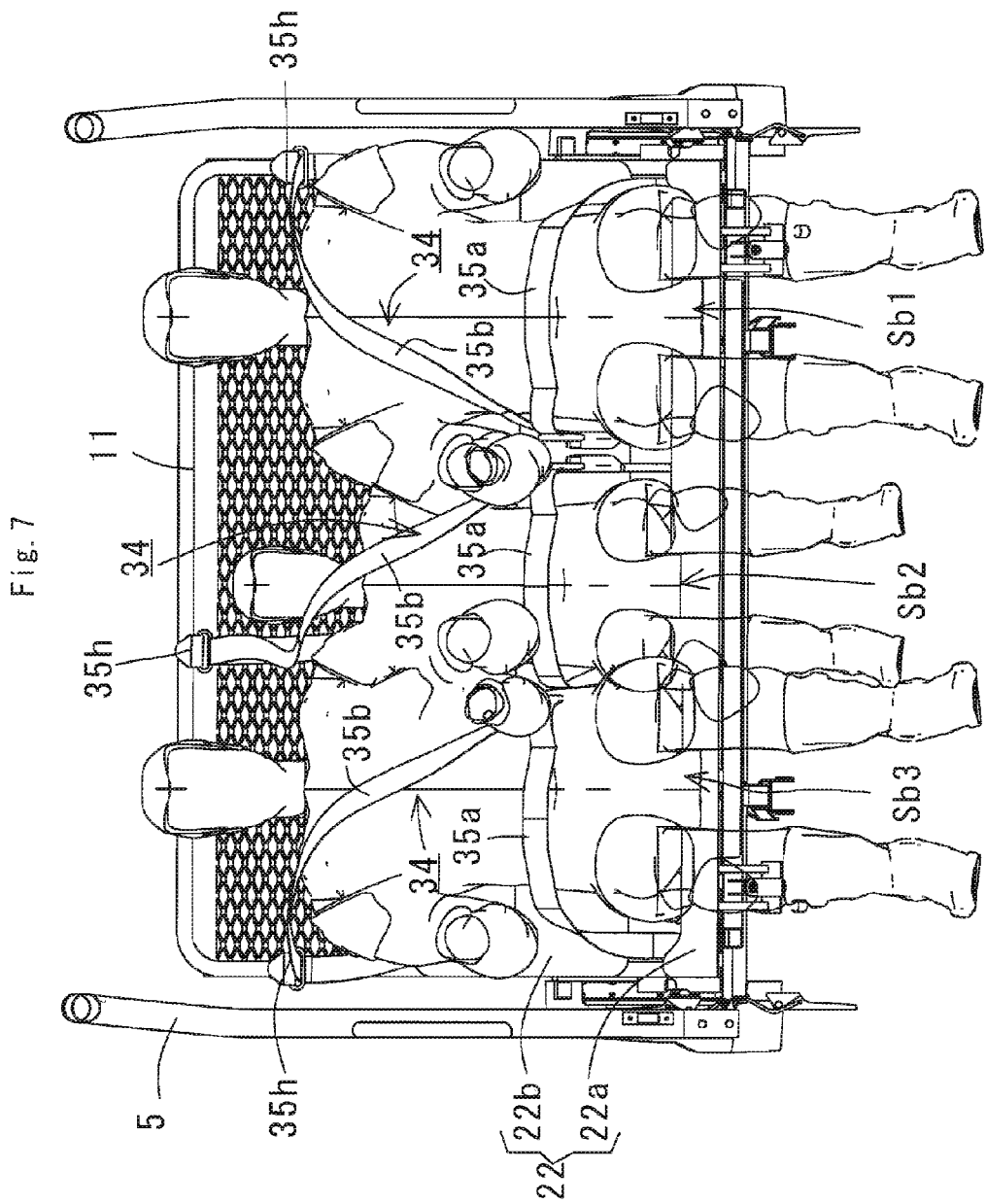
FIG. 7 is a front view of the rear seat at the time of seating.

FIG. 5 is a front view of the rear seat 22 and the screen 11 in the use state, FIG. 6 is a front view of the rear seat 22 and the screen 11 in the stowed state, and FIG. 7 is a front view of the rear seat 22 and the screen 11 in a seating state. In FIG. 6, each of the three-point seat belt systems 34 is provided with a webbing 35c integrally having a lap belt 35a and a shoulder belt 35b, a retractor 35d provided in a rear end of the movable mount 28 of the screen 11, the retractor 35d for supporting one end of the webbing 35c so as to freely wind the one end, a bottom anchor 35e provided in a front end of the movable mount 28, the bottom anchor 35e for supporting the other end of the webbing 35c, a tongue plate 35f installed in the middle of the webbing 35c, a buckle 35g provided in the front end of the movable mount 28 and detachably coupled to the tongue plate 35f, and a top anchor 35h provided in an outer frame of the screen 11, the top anchor 35h for slidably supporting the middle of the shoulder belt 35b. Among the three top anchors 35h, the left and right top anchors 35h are provided in left and right ends of the outer frame of the screen 11 and the central top anchor 35h is provided in an upper end of the outer frame of the screen 11.

As described above, all the retractor 35d, the bottom anchor 35e, the buckle 35g, and the top anchor 35h forming support parts of the three-point seat belt system 34 are fixed to the movable mount 28 or the screen 11 to be moved integrally with the movable mount 28. Therefore, positions of the retractor 35d, the bottom anchor 35e, the buckle 35g, and the top anchor 35h are changed in the front and rear direction together with the movable mount 28, the screen 11, and the front wall 9d.

[Configuration of Seat Belt System 33 of Front Seat 21]

Figure 8:
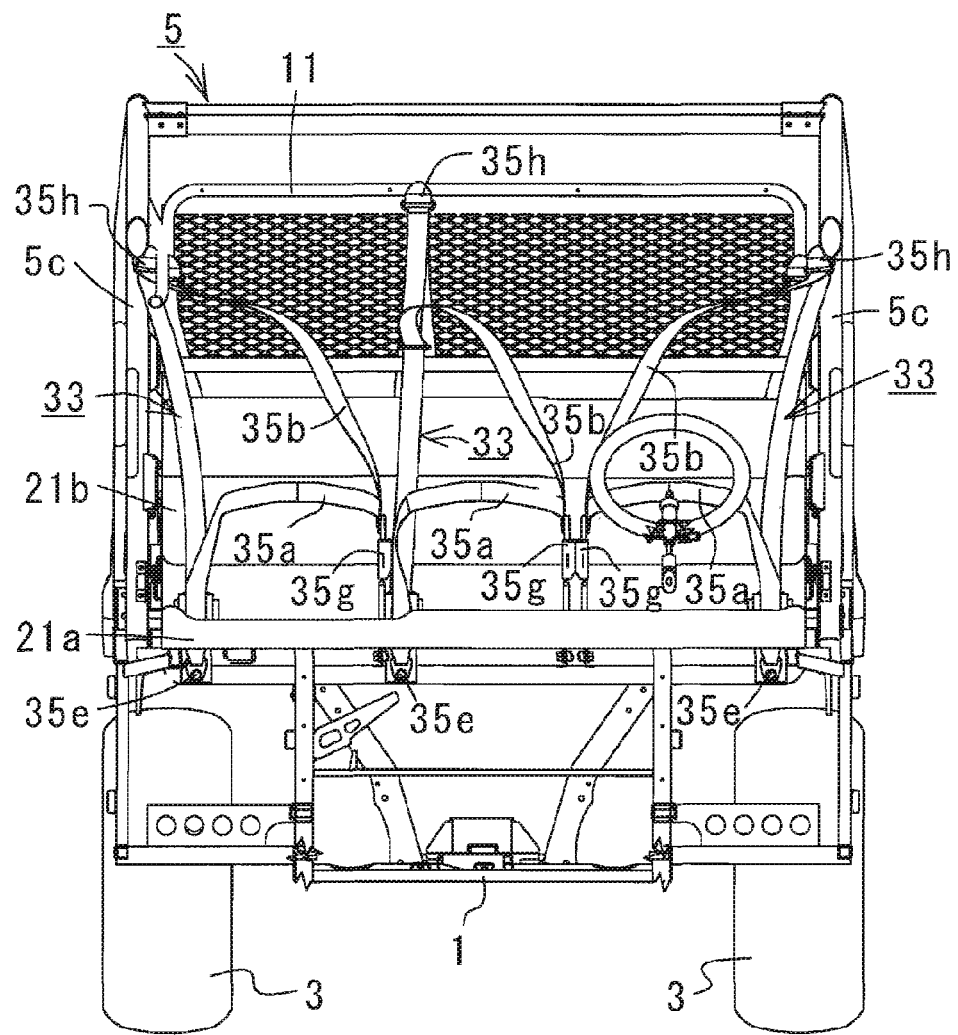
FIG. 8 is a front view of a front seat and the screen.

FIG. 8 is a front view of the front seat 21 and the screen 11. In FIG. 8, the three three-point seat belt systems 33 for the front seat basically have the same structure as the three-point seat belt systems 34 for the rear seat (FIG. 6 and the like). Therefore, parts of the three-point seat belt systems 33 for the front seat corresponding to the parts of the three-point seat belt systems 34 for the rear seat will be given the same reference signs or numbers as the three-point seat belt systems 34 for the rear seat, and detailed description will be omitted. In the three-point seat belt systems 33 for the front seat, top anchors 35h are provided in intermediate vertical pipes 5c and the cross pipes 5b of the ROPS 5. In FIGS. 1 and 2, retractors 35d and bottom anchors 35e of the three-point seat belt systems 33 for the front seat are provided in support legs 23 of the front seat 21.

[Description of Operations]

Tasks relating to stowing of the rear seat 22, expansion of the cargo bed 9, and movement of the screen 11 will be described.

As shown in FIG. 7, three passengers can be seated on the rear seat 22 in the use state. Moreover, any passengers in the seat areas Sb1, Sb2, and Sb3 can respectively put on the three-point seat belt systems 34.

As shown in FIG. 9, in the use state that the passengers can be seated on the rear seat 22, as a matter of course, the cargo bed 9 is in the non-expanded state, and the front wall 9d of the cargo bed 9, the screen 11, and the movable mount 28 are locked to the cargo bed support frame 1a at the second position by the left and right lock devices 30.

In a case where the cargo bed 9 is expanded from a state of FIG. 9, firstly, the rear seat 22 is stowed. That is, the seat bottom 22a of the rear seat 22 is pivoted front-upward (in the arrow A2 direction) on the hinge 26. As shown in FIG. 10, in a state that the seat bottom 22a is substantially vertical, the seat bottom is locked by the stopper 25a.

Next, the lock devices 30 in the state of FIG. 9 are released, and the levers 30a and the holders 30d of FIG. 13 are lifted and pivoted on the pivot pins 31 by 90°. Thereby, the levers 30a and the holders 30d are placed on the inner side in the vehicle width direction of the rear end vertical pipes 5d of the ROPS 5 so as to pass through the inside of the rear end vertical pipes 5d in the front and rear direction.

After that, the screen 11, the movable mount 28, and the front wall 9d are integrally moved forward. In a state that the screen 11 reaches the first position on the front side, the levers 30a and the holders 30d are lowered together with the pivot pins 31 and the pivot pins 31 are inserted into the positioning holes for the first position. Finally, by catching the rings 30c on the hooks 30b for the first position and bringing up the levers 30a, the screen 11 is locked at the first position.

SUMMARY OF EFFECTS OF EMBODIMENT

Effects of the present embodiment will be briefly summarized as follows.

(a) The bottom anchors 35e and the retractors 35d for supporting both ends of the webbings 35c of the three-point seat belt systems 34 for the rear seat, and the buckles 35g are provided in the movable mount 28, and the top anchors 35h for supporting the middle of the webbings 35c are provided in the screen 11. Thus, when the cargo bed 9 is changed between the expanded state and the non-expanded state, the bottom anchors 35e, the buckles 35g, and the like for the rear seat are not disturbing, so that the screen 11 and the movable mount 28 can be integrally moved in the front and rear direction.

(b) The screen 11 is supported by the movable mount 28 and the movable mount 28 is supported by the cargo bed support frame 1a of the chassis 1 movably in the front and rear direction. Thus, at the time of moving the screen 11, there is no need for two workers to lift the screen 11 from both the left and right sides, so that even one worker can easily move the screen 11.

(c) The lock devices 30 capable of fixing the screen 11 and the movable mount 28 at the first position and the second position are provided. Thus, even with a structure for supporting the webbings 31 and the like of the seat belt systems 34 by the screen 11 and the movable mount 28, the webbings and the like can be firmly supported on the chassis 1 side via the movable mount 28 and the like.

(d) The back rest 22b for the rear seat is attached to the screen 11. Thus, by moving the screen 11 forward, the back rest 22b can be also automatically moved forward, so that a task of changing the position of the screen 11 can be easily performed.

(e) The front end of the seat bottom 22a of the rear seat 22 is pivotably supported by the cargo bed support frame 1a of the chassis 1, and the seat bottom 22a is accommodated on the front side of the first position of the screen 11 when the cargo bed 9 is in the expanded state. Thus, the seat bottom 22a of the rear seat 22 can be easily accommodated at the time of the expansion of the cargo bed.

(f) The present invention can also be applied to a vehicle provided with not a bench type seat but an independent type seat as the front seat or the rear seat.

(g) The present invention is not limited to the structure of the above embodiment but includes various modified examples considered within a range not departing from the content described in the claims.

What is claimed is:

1. A utility vehicle comprising:
   a front seat;
   a rear seat;
   a cargo bed;
   a screen for partitioning the cargo bed and a riding space on the front side of the cargo bed; and
   seat belt systems for passengers,
   the cargo bed being changeable between an expanded state
      in which the cargo bed is expanded forward into an area of the rear seat and a non-expanded state in which the cargo bed is not expanded in the area of the rear seat, wherein a movable mount is secured to a lower end of the screen, the screen is movable between a first position corresponding to a front end of the cargo bed in the expanded state and a second position corresponding to the front end of the cargo bed in the non-expanded state in the front and rear direction together with the movable mount, each of the seat belt systems has a three-point seat belt structure, a bottom anchor and a retractor for supporting both ends of a webbing of the seat belt system for the rear seat, and a buckle are provided in the movable mount, and a top anchor for supporting the middle of the webbing on the upper side of a back rest of the rear seat is provided in the screen.

2. The utility vehicle according to claim 1, comprising:

a lock device capable of fixing the screen and the movable mount at the first position and the second position, respectively.

3. The utility vehicle according to claim 1, wherein the back rest for the rear seat is attached to the screen.

4. The utility vehicle according to claim 1, wherein a front end of a seat bottom of the rear seat is pivotably supported by a vehicle body frame member, and the seat bottom is accommodated on the front side of the first position of the screen at the time of expansion of the cargo bed.

* * * * *